US012646438B2

(12) United States Patent
Nishitani et al.

(10) Patent No.: US 12,646,438 B2
(45) Date of Patent: *Jun. 2, 2026

(54) VIDEO PROCESSING DEVICE AND DISPLAY SYSTEM

(71) Applicant: LAPIS Technology Co., Ltd., Yokohama (JP)

(72) Inventors: Naoki Nishitani, Yokohama (JP); Yuki Imatoh, Yokohama (JP)

(73) Assignee: LAPIS Technology Co., Ltd., Yokohama (JP)

(*) Notice: Subject to any disclaimer, the term of this patent is extended or adjusted under 35 U.S.C. 154(b) by 164 days.

This patent is subject to a terminal disclaimer.

(21) Appl. No.: 18/581,383

(22) Filed: Feb. 20, 2024

(65) Prior Publication Data

US 2024/0290247 A1 Aug. 29, 2024

(30) Foreign Application Priority Data

Feb. 27, 2023 (JP) ................................ 2023-028964

(51) Int. Cl.
*G09G 3/20* (2006.01)
*G09G 5/393* (2006.01)

(52) U.S. Cl.
CPC ........... *G09G 3/2096* (2013.01); *G09G 5/393* (2013.01); *G09G 2320/103* (2013.01); *G09G 2330/12* (2013.01); *G09G 2360/12* (2013.01); *G09G 2380/10* (2013.01)

(58) Field of Classification Search
CPC ................ G09G 3/2096; G09G 5/393; G09G 2320/103; G09G 2330/12; G09G 2360/12; G09G 2380/10
See application file for complete search history.

(56) References Cited

U.S. PATENT DOCUMENTS 4,893,182 A * 1/1990 Gautraud .................. G06T 7/20
348/E5.054
8,503,451 B2 * 8/2013 Mallory ................ H04L 1/1877
370/473
9,854,232 B2 * 12/2017 Greene .............. H04N 21/4622
11,462,192 B2 * 10/2022 Gerdes ................... G09G 3/006

FOREIGN PATENT DOCUMENTS

JP 2016039508 3/2016
JP 2018079839 5/2018
JP 2022077197 5/2022

* cited by examiner

*Primary Examiner* — Xin Sheng
(74) *Attorney, Agent, or Firm* — JCIPRNET

(57) ABSTRACT

A video processing device is configured to: generate a frame number which represents a frame to which video data belong and a value of which changes between consecutive frames; for each data block of a predetermined size in the video data, embed the frame number in a portion of the data block; write, in a frame order, the video data into a memory by using a data block as a unit; successively read data blocks written into the memory; and generate an abnormality determination signal indicating frozen video in a case where a state in which the frame number in the data block currently read does not change from the frame number in the data block read last time continues for a predetermined number of times or more.

14 Claims, 3 Drawing Sheets

VIDEO PROCESSING DEVICE AND DISPLAY SYSTEM

CROSS-REFERENCE TO RELATED APPLICATION

This application claims priority under 35 USC 119 from Japanese Patent application No. 2023-028964 filed on Feb. 27, 2023, the disclosure of which is incorporated by reference herein.

BACKGROUND

Technical Field

The disclosure relates to a video processing device and a display system.

Description of Related Art

In a display system, a video displayed on a display may become frozen. Video becoming frozen indicates that, even though the display is driven based on a video signal showing motion pictures, the video of the motion pictures represented by the video signal is not displayed, and the image of the same frame keeps being displayed and a static image is shown as a result. Frozen video results from various reasons, such as malfunctioning of a video source like a camera, or malfunctioning of a graphic generation part that generates video data.

As a technique for detecting frozen video, Japanese Laid-open No. 2022-077197 discloses a video processing device that assigns a frame number to video data supplied successively and generates an abnormality determination signal indicating frozen video based on the frame number.

The technique disclosed in Japanese Laid-open No. 2022-077197 has the issue that the data transfer rate decreases in order to assign the frame number to video data.

The disclosure provides a video processing device and a display system capable of detecting frozen video while suppressing the data transfer rate from decreasing.

SUMMARY

A video processing device according to the disclosure includes: a generation part, generating a frame number which represents a frame to which video data belong, a value of the frame number changing between consecutive frames; an embedding part, for each data block of a predetermined size in the video data, embedding the frame number in a portion of the data block; a writing part, writing, in a frame order, the video data into a memory by using a data block as a unit; a reading part, successively reading data blocks written into the memory; and a determination part, generating an abnormality determination signal indicating frozen video in a case where a state in which the frame number in the data block currently read by the reading part does not change from the frame number in the data block read last time continues for a predetermined number of times or more.

DESCRIPTION OF THE EMBODIMENTS

According to the disclosure, frozen video can be detected, and the data transfer rate can be suppressed from decreasing.

In the following, the embodiments for implementing the technique of the disclosure will be described in detail with reference to the drawings.

Figure 1:
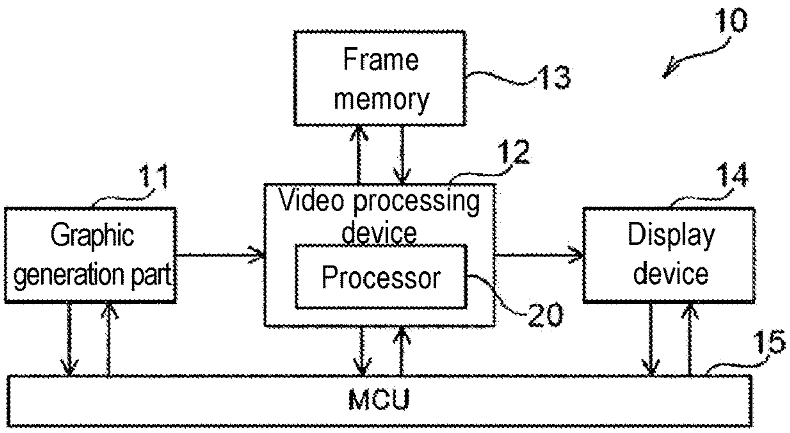
FIG. 1 is a block diagram illustrating an example of a configuration of a display system.

Firstly, the configuration of a display system 10 according to the embodiment is described with reference to FIG. 1. As shown in FIG. 1, the display system 10 includes a graphic generation part 11, a video processing device 12, a frame memory 13, a display device 14, and a micro controller unit (MCU) 15. The display system 10, for example, is mounted in a vehicle.

The graphic generation part 11 is connected with the video processing device 12. The video processing device 12 is connected with the frame memory 13 and the display device 14. The MCU 15 is connected with the graphic generation part 11, the video processing part 12, and the frame memory 13.

The graphic generation part 11 generates video data showing information, such as navigation information, required during traveling of the vehicle through graphic performance. The graphic generation part 11 successively supplies the video data of each frame to the video processing device 12 according to a frame order. Here, the video data refer to image data of each frame.

The video processing device 12 includes a processor 20. As an example, the processor 20 may be a programmable logic device (PLD), etc., whose circuit configuration is able to change after being manufactured, such as a field programmable gate array (FPGA). The processor 20 may also be a central processing unit (CPU), etc., that is a general-purpose processor executing software (program). In addition, the processor 20 may also be formed by a combination of two or more processors of the same or different kinds.

The video processing device 12 obtains the video data successively supplied from the graphic generation part 11, divides the video data into data blocks of a predetermined size, and writes each data block into the frame memory 13. In addition, the video processing device 12 successively reads the data blocks written into the frame memory 13. The video processing device 12 can change a reading frequency with respect to a writing frequency. The video processing device 12 performs a burst transfer at the time of writing data blocks to the frame memory 13 and at the time of reading data blocks from the frame memory 13.

The frame memory 13 is configured to include a random access memory (RAM) having multiple storage regions to be able to store the data blocks of video data for multiple frames. The frame memory 13 is an example of a memory related to the disclosed technique.

The display device 14 is a device that includes a display (not shown), and displays videos on the display based on the video data input from the video processing device 12.

The MCU 15 is a control part that controls the entire display system 10. The contents of the control of the MCU 15 include, for example, control over the operation timings of the graphic generation part 11, the video processing device 12, and the display device 14, etc.

Figure 2:
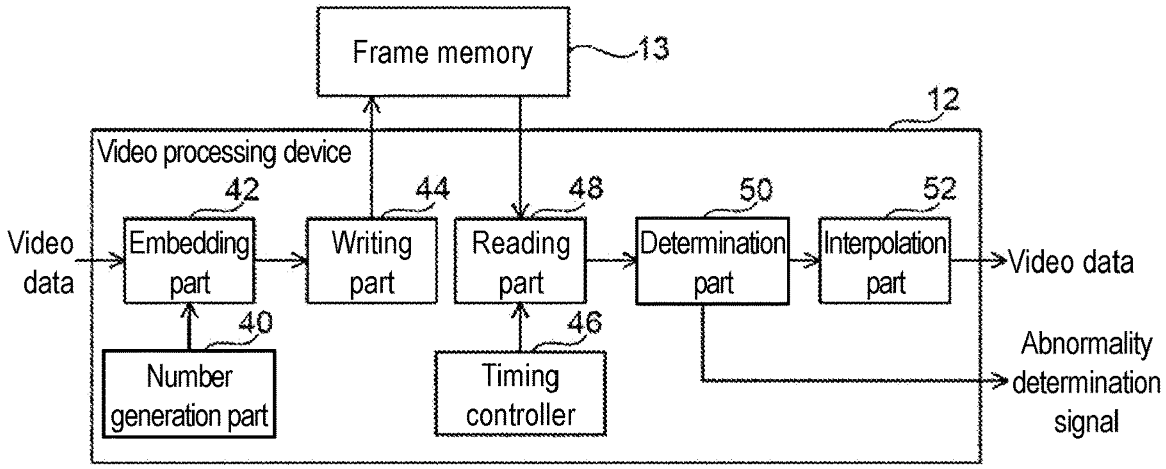
FIG. 2 is a block diagram illustrating an example of a functional configuration of a video processing device.

The video processing device 12 has a function of detecting frozen video. Referring to FIG. 2, the functional configuration of the video processing device 12 according to the embodiment is described. As shown in FIG. 2, the video processing device 12 includes a number generation part 40, an embedding part 42, a writing part 44, a timing controller 46, a reading part 48, a determination part 50, and an interpolation part 52. The processor 20 functions as the number generation part 40, the embedding part 42, the writing part 44, the timing controller 46, the reading part 48, the determination part 50, and the interpolation part 52 by executing logics set in advance.

The number generation part 40 generates frame numbers which represent frames to which the video data successively supplied from the graphic generation part 11 belong and values of which change between consecutive frames. The number generation part 40 assigns the same frame number to video data of the same frame, and assigns a frame number incremented by one to the video data of a frame following the frame.

The embedding part 42 embeds the frame number generated by the number generation part 40 into a portion of the data block for each data block of a predetermined size in the video data. In addition, the embedding part 42 generates a cyclic redundancy check (CRC) symbol by using the data block, the frame number, and the address of the frame memory 13 as the writing destination, and embeds the CRC symbol into each data block in addition to the frame number.

The process of embedding the frame number and the CRC symbol by using the embedding part 42 is described in detail with reference to FIG. 3. Here, the case where the resolution of the video data of one frame is 1920 pixels×1080 pixels, the size of the data block is 128 bytes, the size of one pixel is 16 bits, the size of the frame number is 8 bits, and the size of the CRC symbol is 8 bits is described as an example. That is, in the example of FIG. 3, one data block is formed by 64 (=128 [bytes]×8÷16 [bits]) pixels.

Figure 3:
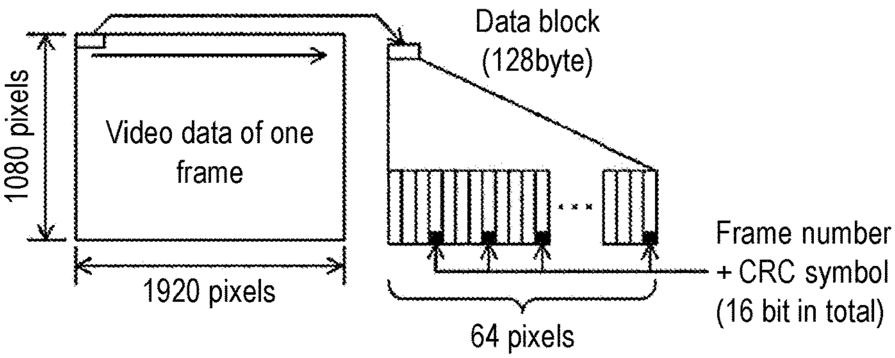
FIG. 3 is a view illustrating a process for embedding a frame number and a CRC symbol.

As shown in FIG. 3, the writing part 44 to be described afterwards, from upper left to lower right of the video data, successively writes the data blocks of 128 bytes to the frame memory 13 through burst transfer. The embedding part 42 embeds the frame number and the CRC symbol to each data block. The embedding part 42 embeds a bit string representing the frame number and the CRC symbol into multiple pixels forming the data block in a bit-by-bit manner at an equal pixel interval. In the example of FIG. 3, one data block has 64 pixels, and the frame number and the CRC symbol are 16 bits. Therefore, one bit forming the frame number or the CRC symbol is embedded into the pixels at an interval of three pixels. At this time, the embedding part 42 replaces the initial bit of the pixel with one bit forming the frame number or the CRC symbol, thereby embedding the one bit. It is noted that the embedding part 42 may also embeds the one bit forming the frame number or the CRC symbol into a bit at a position other than the initial position of the pixel.

The writing part 44 writes the video data into the frame memory 13 in the frame order by using a data block as a unit. The data block written into the frame memory 13 by using the writing part 44 is a data block in which frame number and the CRC symbol are embedded by the embedding part 42. When finishing the writing of one data block with respect to one storage region of the frame memory 13, the writing part 44 starts the writing of another data block next to the data block to another storage region of the frame memory 13.

The timing controller 46 controls the reading timings of the data blocks by using the reading part 48.

The reading part 48 successively reads the data blocks written into the frame memory 13 by the writing part 44.

The determination part 50 extracts the frame numbers and the CRC symbols from the data blocks read by the reading part 48. The frame number and the CRC symbol are embedded into predetermined pixels at an equal pixel interval, such as being embedded to the first pixel, the fifth pixel, the ninth pixel, and so on. In addition, the frame number and the CRC symbol are embedded into the initial bits of the pixels. Accordingly, the determination part 50 can extract the frame number and the CRC symbol by extracting the initial bits of the pixels of the data block in a predetermined order.

Then, the determination part 50 determines whether the state in which the frame number in the data block currently read by the reading part 48 does not change from the frame number in the data block read last time has continued for a predetermined number of times or more. In addition, the determination part 50 performs error detection based on the CRC symbol in the data block read by the reading part 48. In the case where the state in which the frame number in the data block currently read by the reading part 48 does not change from the frame number in the data block read last time has continued for the predetermined number of times or more, and in the case where an error is detected based on the CRC symbol, the determination part 50 detects frozen video. In this case, the determination part 50 generates an abnormality determination signal indicating the frozen video, and outputs the generated abnormality determination signal to the MCU 15.

Figure 4:
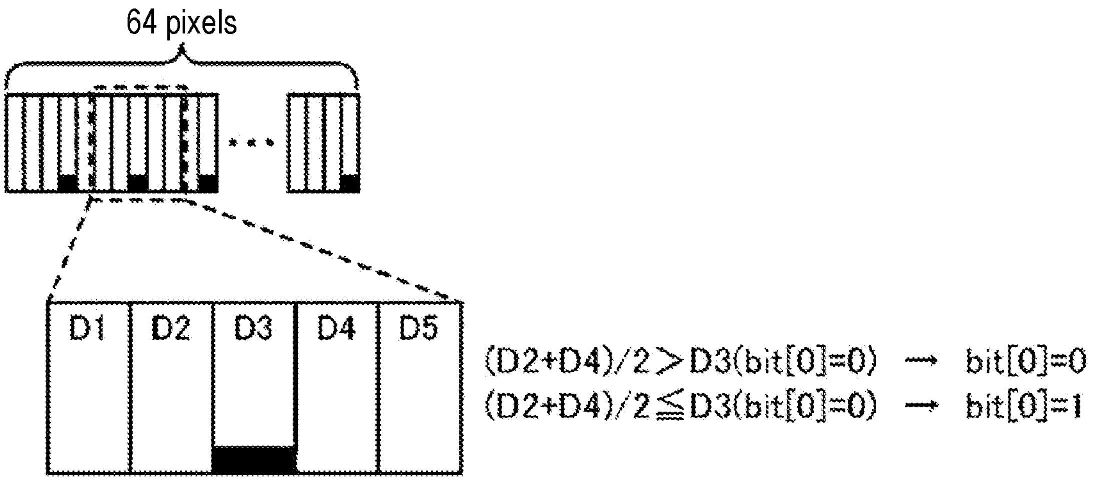
FIG. 4 is a diagram illustrating an interpolation process.

The interpolation part 52 performs interpolation on the pixel values of pixels in which the frame number and the CRC symbol in the data block are read from the frame memory 13 through the reading part 48 by using the pixel values of the peripheral pixels of the pixels. In the embodiment, the interpolation part 52 performs interpolation, so that the pixel values of the pixels in which the frame number and the CRC symbol are embedded are close to the pixel values of two adjacent pixels in the same data block. An interpolation process performed by the interpolation part 52 is described in detail with reference to FIG. 4. In FIG. 4, D1 to D5 indicate the pixel values of the respective pixels. In addition, in FIG. 4, an example is shown, in which a pixel whose pixel value is D3 is a pixel in which one bit among the bit string forming the frame number and the bit string forming the CRC symbol is embedded. That is, in the example, the pixel is an interpolation target pixel. In addition, "D3(bit[0]=0)" in FIG. 4 represents the pixel value D3 in the case of replacing the initial bit with 0. As described above, the initial bit is one bit among the bit string forming the frame number and the bit string forming the CRC symbol.

As shown in FIG. 4, in the case where the average of pixel values D2 and D4 of the two pixels adjacent to the interpolation target pixel exceeds the pixel value D3 when the initial bit is replaced with 0, the interpolation part 52 replaces the initial bit of the pixel value D3 with 0. Meanwhile, in the case where the average of the pixel values D2 and D4 of the two pixels adjacent to the interpolation target pixel is equal to or less than the pixel value D3 when the initial bit is replaced with 0, the interpolation part 52 replaces the initial bit of the pixel value D3 with 1. Accordingly, the brightness of the interpolation target pixel is close to the brightness of the two adjacent pixels.

Figure 5:
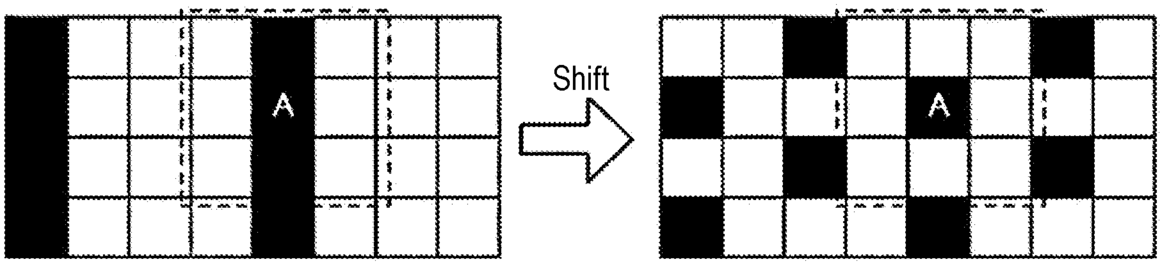
FIG. 5 is a diagram illustrating an interpolation process according to a modified example.

The interpolation part 52 may also perform interpolation using multiple data blocks. An interpolation process performed by the interpolation part 52 for such configuration example is described in detail with reference to FIG. 5. Here, video data of three or more rows are read by the reading part 48. Also, here, a pixel A shown in FIG. 5 is the interpolation target pixel. In addition, the pixels filled in black in FIG. 5 show pixels in which the frame number or the CRC symbol is embedded.

As shown in FIG. 5, the interpolation part 52 shifts rows above and below the interpolation target pixel by two pixels, so that no pixel embedded with the frame number or the CRC symbol is present in the eight pixels on the periphery of the interpolation target pixel at the top, the bottom, the left, and the right. Then, the interpolation part 52 calculates the average of the pixel value of the interpolation target pixel and the pixel values of the peripheral values of the interpolation target pixel. Then, the interpolation part 52 replaces the pixel value of the interpolation target pixel with the calculated average. Accordingly, the brightness of the interpolation target pixel is close to the brightness of the peripheral pixels.

Figure 6:
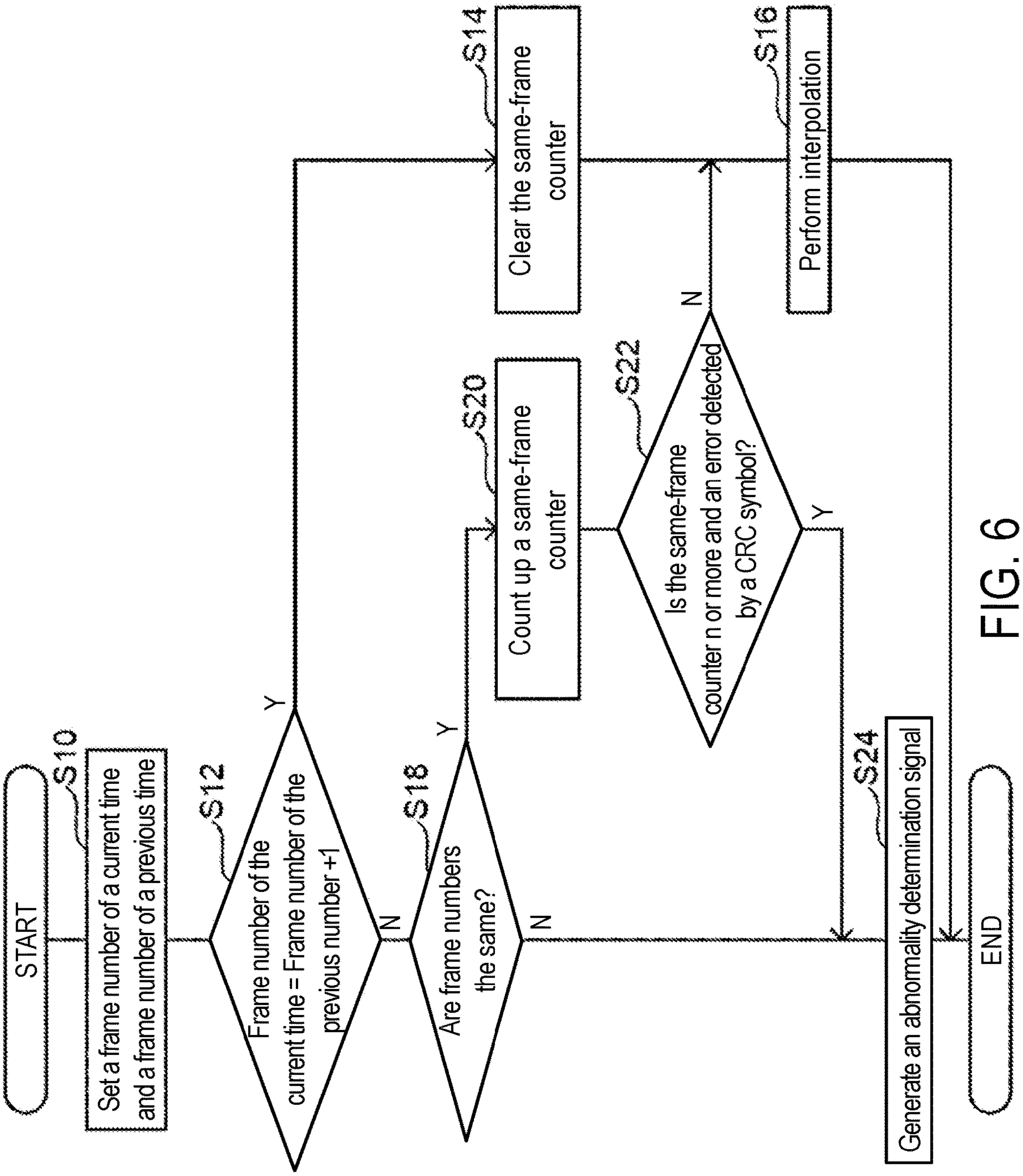
FIG. 6 is a flowchart illustrating an example of a frozen video detection process.

Then, with reference to FIG. 6, the flow of the operations of the determination part 50 and the interpolation part 52 in the case where the video processing device 12 does not perform frame rate conversion, i.e., the case where the writing frequency and the reading frequency with respect to the frame memory 13, are the same is described.

In Step 10 of FIG. 6, the determination part 50 extracts the frame number and the CRC symbol from the data blocks that are read every time when the reading part 48 reads the data blocks. In addition, the determination part 50 sets the extracted frame number as the new current frame number, and sets the current frame number so far as the previous frame number.

In Step S12, the determination part 50 determines whether the current frame number is +1 with respect to the previous frame number. In the case where the determination is affirmative, the process proceeds to Step S14. In Step S14, a same-frame counter, which is a counter for counting the number of times that the data blocks of the same frame have continued, is cleared. The same-frame counter is a counter that counts up by 1 each time, and may be realized by either hardware or software.

In Step S16, as described above, by using the pixel values of the peripheral pixels of the pixels, the interpolation part 52 performs interpolation on the pixel values of the pixels in which the frame number and the CRC symbol in the data block are read from the frame memory 13 through the reading part 48. The interpolation part 52 outputs the data block having undergone the interpolation process to the display device 14. The display device 14 displays the video based on the video data input from the video processing device 12.

Meanwhile, in the case where the determination is negative in Step S12, the process proceeds to Step S18. In Step S18, the determination part 50 determines whether the current frame number is the same as than the previous frame number. In the case where the determination is affirmative, the process proceeds to Step S20, and in the case where the determination is negative, the process proceeds to Step S24. In Step S20, the determination part 50 counts up the same-frame counter.

In Step S22, the determination part 50 determines whether the state in which the current frame number does not change from the previous frame number has continued for n times or more by determining whether the same-frame counter is n or more. Here, n is a positive integer, and is the number of video data forming one frame. In the case where the writing frequency and the reading frequency are the same, when writing and reading are executed normally, the video data of the same frame are read continuously n−1 times, which is −1 with respect to the number n of video data forming one frame, and the video data read next is the video data of the next frame number. Accordingly, the integer n is set as the value of the comparison target. Considering tolerance, the integer n may also be a value slightly greater than the number of video data forming one frame.

In Step S22, the determination part 50 further performs error detection based on the CRC symbol, and determines whether an error is detected based on the CRC symbol. In the case where the state in which the determination part 50 determines that the current frame number does not change from the previous frame number has continued for n times or more and detects an error based on the CRC symbol, the determination of Step S22 is affirmative, and the process proceeds to Step S24. In Step S22, it may also be that the determination part 50 determines whether the state in which the current frame number does not change from the previous frame number has continued for n times or more and whether the state in which an error is detected based on the CRC symbol has continued for n times or more.

In Step S24, the determination part 50 generates an abnormality determination signal indicating the frozen video, and outputs the generated abnormality determination signal to the MCU 15. In the case of receiving the abnormality determination signal from the video processing device 12, the MCU 15 stops the operation of the graphic generation part 11, the video processing device 12, and the display device 14. It may also be that, in the case of receiving the abnormality determination signal from the video processing device 12, the MCU 15 stops the operation of one or two of the graphic generation part 11, the video processing device 12, and the display device 14. In the case where the determination is negative in Step S22, the process proceeds to Step S16.

In the case where the video processing device 12 performs frame rate conversion, in Step S12, the determination part 50 determines whether the current frame number is +N with respect to the previous frame number. Also, in this case, the determination part 50 determines whether the same-frame counter is M or less. Here, the value of each of N and M changes in accordance with the contents of frame rate conversion. N is a positive integer, and is the size of the change when the frame numbers of the data blocks read by the reading part 48 change normally. In the case of reading frames whose frame numbers increase by 1 without reduction, N=1, in the case of reading video data through reducing by one frame, N=2. M is the number of times that is −1 with respect to the number of times that the data block of the same frame is supposed to be read at the time of frame rate conversion or a value more than, by a tolerance value, the number of times that is −1 with respect to the number of times that is supposed to be read.

As a specific example in the case where the reading frequency is greater than the writing frequency for the frame memory 13, a case where the writing frame rate is 30 fps and the reading frame rate is 60 fps is described as an example. In such case, the data blocks of each frame are repetitively read twice from the frame memory 13. Accordingly, in the determination part 50, in the case where the state in which the current frame number is not +1 with respect to the previous frame number, that is, the state of the same frame number where the difference therebetween is 0, has continued for 2n (i.e., M) times or more, for example, the abnormality determination signal is generated.

When the reading frame rate is set to be m (m being an integer of 2 or more) times with respect to the writing frame rate in this way, the data blocks of each frame are repetitively read m times from the frame memory 13. Accordingly, in the determination part 50, if the state in which the current frame number is not +N=+1 with respect to the previous frame number, that is, the state of the same frame number where the difference therebetween is 0, has continued more than M times, the abnormality determination signal is generated.

As a specific example in the case where the reading frequency is smaller than the writing frequency for the frame memory 13, a case where the writing frame rate is 30 fps and the reading frame rate is 15 fps is described as an example. In such case, the data blocks of the respective frames are reduced by one frame and read from the frame memory 13. Accordingly, in the determination part 50, if the state in which the current frame number is not +2 with respect to the previous frame number, that is, the state of 0 or +1, has continued for n(=M+1) times or more, the abnormality determination signal is generated.

In this way, when the reading frame rate with respect to the writing frame rate is 1/m, the data blocks of the respective frames are read from the frame memory 13 by being reduced by m−1 frames. Accordingly, in the determination part 50, if the state in which the current frame number is not +N=+m with respect to the previous frame number, that is, the state any of 0, +1, . . . , +(m−1), has continued more than M times, the abnormality determination signal is generated.

As described above, according to the embodiment, the frame number and the CRC symbol are embedded inside the video data, and frozen video is detected based on the frame number and the CRC symbol. In the example of FIG. 3, in the case where the frame number and the CRC symbol are externally added to the video data, among the data of 128 bytes, 126 bytes are data blocks forming the video data, and 2 bytes form the frame number and the CRC symbol. That is, in such case, during one burst transfer to the frame memory 13, video data of 63 pixels (=126 [bytes]×8÷16 [bits]) are transferred. Comparatively, in the embodiment, in one burst transfer to the frame memory 13, video data of 64 pixels are transferred. Therefore, according to the embodiment, the data frame rate can be suppressed from decreasing, and frozen video can be detected.

In the embodiment, the embedding part 42 is described to embed the bit strings representing the frame number and the CRC symbol into multiple pixels forming the data block in a bit-by-bit manner at an equal pixel interval. However, the disclosure is not limited thereto. For example, the embedding part 42 may also embed the bit strings representing the frame number and the CRC symbol into multiple pixels forming the data block in a bit-by-bit manner at random pixel intervals by using pseudo-random numbers, etc. In such case, the embedding part 42 may also output the positions of the pixels in which the frame number and the CRC symbol are embedded and the positions of the bits inside the pixels to the determination part 50 and the interpolation part 52.

Also, in the embodiment, between the frame number and the CRC symbol, it may also be that the embedding part 42 does not embed the CRC symbol into a portion of the data block.

In addition, in the embodiment, the frame number generated by the number generation part 40 successively increases. However, the frame number may also decrease successively. In addition, although the frame number generated by the number generation part 40 is incremented by +1 in the frame order of the video, the frame number may also be a frame number that changes by a predetermined number, except for +1, between consecutive frames.

In addition, in the embodiment, although the graphic generation part 11 is used as a video source, other video sources, such as a camera, may also be used.

What is claimed is:

1. A video processing device, comprising:

a generation part, generating a frame number which represents a frame to which video data belong, wherein a value of the frame number changes between consecutive frames;

an embedding part, for each data block of a predetermined size in the video data, embedding the frame number in a portion of the data block;

a writing part, writing, in a frame order, the video data into a memory by using a data block as a unit;

a reading part, successively reading the data blocks written into the memory; and a determination part, generating an abnormality determination signal indicating frozen video in a case where a state in which the frame number in the data block currently read by the reading part does not change from the frame number in the data block read last time has continued for a predetermined number of times or more.

2. The video processing device as claimed in claim 1, wherein the embedding part embeds bit-by-bit a bit string representing the frame number into a plurality of pixels forming the data block.

3. The video processing device as claimed in claim 2, wherein the embedding part embeds bit-by-bit the bit string representing the frame number into the pixels forming the data block at an equal pixel interval.

4. The video processing device as claimed in claim 3, further comprising an interpolation part, by using pixel values of peripheral pixels of the pixel, performing interpolation on a pixel value of a pixel in which the frame number is embedded in the data block read from the memory by the reading part.

5. The video processing device as claimed in claim 3, wherein for each data block, the embedding part further embeds, in addition to the frame number, a CRC symbol into a portion of the data block, the CRC symbol being generated from the data block, the frame number, and an address of the memory as a writing destination, the determination part performs error detection based on the CRC symbol, and the determination part generates the abnormality determination signal in the case where the state in which the frame number in the data block currently read by the reading part does not change from the frame number in the data block read last time continues for the predetermined number of times or more and a case where an error is detected based on the CRC symbol.

6. The video processing device as claimed in claim 2, wherein the embedding part embeds bit-by-bit the bit string representing the frame number into the pixels forming the data block at random pixel intervals.

7. The video processing device as claimed in claim 6, further comprising an interpolation part, by using pixel values of peripheral pixels of the pixel, performing interpolation on a pixel value of a pixel in which the frame number is embedded in the data block read from the memory by the reading part.

8. The video processing device as claimed in claim 6, wherein for each data block, the embedding part further embeds, in addition to the frame number, a CRC symbol into a portion of the data block, the CRC symbol being generated from the data block, the frame number, and an address of the memory as a writing destination, the determination part performs error detection based on the CRC symbol, and the determination part generates the abnormality determination signal in the case where the state in which the frame number in the data block currently read by the reading part does not change from the frame number in the data block read last time continues for the predetermined number of times or more and a case where an error is detected based on the CRC symbol.

9. The video processing device as claimed in claim 2, further comprising an interpolation part, by using pixel values of peripheral pixels of the pixel, performing interpolation on a pixel value of a pixel in which the frame number is embedded in the data block read from the memory by the reading part.

10. The video processing device as claimed in claim 2, wherein for each data block, the embedding part further embeds, in addition to the frame number, a CRC symbol into a portion of the data block, the CRC symbol being generated from the data block, the frame number, and an address of the memory as a writing destination, the determination part performs error detection based on the CRC symbol, and the determination part generates the abnormality determination signal in the case where the state in which the frame number in the data block currently read by the reading part does not change from the frame number in the data block read last time continues for the predetermined number of times or more and a case where an error is detected based on the CRC symbol.

11. The video processing device as claimed in claim 1, further comprising an interpolation part, by using pixel values of peripheral pixels of the pixel, performing interpolation on a pixel value of a pixel in which the frame number is embedded in the data block read from the memory by the reading part.

12. The video processing device as claimed in claim 1, wherein for each data block, the embedding part further embeds, in addition to the frame number, a CRC symbol into a portion of the data block, the CRC symbol being generated from the data block, the frame number, and an address of the memory as a writing destination, the determination part performs error detection based on the CRC symbol, and the determination part generates the abnormality determination signal in the case where the state in which the frame number in the data block currently read by the reading part does not change from the frame number in the data block read last time continues for the predetermined number of times or more and a case where an error is detected based on the CRC symbol.

13. A display system, comprising:

the video processing device as claimed in claim 1; and a display device, displaying a video based on video data input from the video processing device.

14. The display system as claimed in claim 13, further comprising: a control part, in a case where the abnormality determination signal is generated, stopping at least one of the video processing device and the display device from operating.

* * * * *